(12) United States Patent
Munakata et al.

(10) Patent No.: US 9,891,449 B2
(45) Date of Patent: Feb. 13, 2018

(54) CLIP-ON TYPE EYEGLASSES

(71) Applicant: SUN-RAY Corporation, Osaka (JP)

(72) Inventors: Yoshikazu Munakata, Osaka (JP);
Chiharu Ishibe, Osaka (JP)

(73) Assignee: SUN-RAY CORPORATION, Nishi-Ku Osaka (JP)

( * ) Notice: Subject to any disclaimer, the term of this patent is extended or adjusted under 35 U.S.C. 154(b) by 0 days.

(21) Appl. No.: 15/210,473

(22) Filed: Jul. 14, 2016

(65) Prior Publication Data

US 2017/0017096 A1    Jan. 19, 2017

(30) Foreign Application Priority Data

Jul. 14, 2015   (JP) .................. 2015-140322

(51) Int. Cl.
*G02C 9/04*   (2006.01)
*G02C 9/02*   (2006.01)

(52) U.S. Cl.
CPC ................ *G02C 9/04* (2013.01); *G02C 9/02* (2013.01); *G02C 2200/26* (2013.01)

(58) Field of Classification Search
CPC ............. G02C 1/023; G02C 9/04; G02C 1/02
USPC ....................... 351/47, 48, 57, 44
See application file for complete search history.

(56) References Cited

U.S. PATENT DOCUMENTS

2006/0119786 A1* 6/2006 Munakata ................ G02C 9/02
351/47

FOREIGN PATENT DOCUMENTS

| JP | 58-91721 A | 6/1983 |
|---|---|---|
| JP | 4139379 B2 | 8/2008 |
| JP | 3158051 U | 3/2010 |

* cited by examiner

*Primary Examiner* — Hung Dang
(74) *Attorney, Agent, or Firm* — Hamre, Schumann, Mueller & Larson, P.C.

(57) ABSTRACT

This invention provides a clip-on member 1 includes a lens mounting rod 2 to which clip-on lenses are mounted, and a pair of upper clipping arms 4 and another pair of lower clipping arms 5 made of elastic members for attachment to the eyeglass frame. The upper clipping arms 4 include an upper hooking part 4a and another upper hooking part 4b with which the upper clipping arms 4 are fitted and mounted to the brow part of the spectacle frame from above. The lower clipping arm 5 includes an arm part 7a, an arm part 7b, and a pinching part 8. The arm parts 7a and 7b have left engagement part Sa and right engagement part Sb respectively held by the holding parts 6a and 6b, and placed at the nasal area of the spectacle frame between its right and left lenses. The lower left and right hooking parts 7a and 7b, as an extension of the clipping arms 7a and 7b, exercise theft elastic force towards the opposite sides, thus moving away from each other.

10 Claims, 8 Drawing Sheets

CLIP-ON TYPE EYEGLASSES

BACKGROUND OF THE INVENTION

Technical Field

This invention relates to a clip-on type eyeglasses configured in such a manner that a clip-on attachment such as sunglasses is mounted to the front of the spectacle frame in a manner that allows it to be attached and detached freely to and from the spectacle frame.

Description of the Background Art

For a user in need of corrective eyeglasses and who also wishes to use sunglasses, a clip-on type sunglasses that can be attached to and detached freely from normal prescription glasses have also been in common use instead of prescription sunglasses. Some of such clip-on type sunglasses are configured in a manner that allows attachment and detachment thereof freely and is also configured with a flip-up system so that they can be removed from a user's field of view without the need of removing the clip-on attachment from the spectacle frame. Such sunglasses have an advantage in that use of these sunglasses can be temporarily interrupted when the user enters a dark place such as a room or a tunnel.

Japanese Utility Model Application Publication No. Sho 58-91721 (patent literature 1) discloses a prior art relating to the aforementioned clip-on type eyeglasses. This prior art discloses a clip-on member provided with a clip-shaped lens gripping member at the central portion of the clip-on member. The prior art of patent literature 1 is to grip and hold eyeglass lenses with or without eye rims, gripping clips and gripping poles provided to a chassis. These sunglasses can be configured in a manner that allows flipping-up thereof. Likewise, Japanese Utility Model Registration No. 3158051 (patent literature 2) further discloses a clip-type attachment member. The lens gripping member in the patent literature 2 has a pressure part that can be rotated in an angular range between a pressurized state where the pressure part is pressed against the back surfaces of eyeglass lens parts under a bias and an expanded state where the pressure part is rotated to be placed in a backward position. In the expanded state, upper edge portions of the eyeglass lens parts can be fitted in gaps formed between pressure strips of the lens pressure member and auxiliary lens parts. The eyeglass lens parts can be gripped elastically between the auxiliary lens parts and the pressure part.

The aforementioned prior arts do not provide an attractive appearance because the lens gripping member and its supporting mechanism, usually located at the center portion of the clip-on is too obtrusive. The gripping poles or the pressure part of the clip-on pinches the lenses of the spectacle frame while it is in contact with its lens surface. This may cause damages on the surface of the lenses in the spectacle side.

Various means of attaching the clip-on member to the spectacle frame have been suggested in addition to the aforementioned type that pinches and holds the lens surface, such as a clip-on member that grips the rim of the spectacle frame. Japanese Patent No. 4139379 (patent literature 3) discloses one such means. This means allows the clip-on to be held without making contact with the lens surface when the front clip-on member is attached to the spectacle frame. Patent literature 3 is for holding the clip-on member by gripping the rim of the spectacle frames or the edge of the lenses when the frame does not have rims.

As disclosed in the first embodiment case, in the patent literature 3 the clip-on member consists of a set of four clipping (metal wire material, for example) with strong elasticity which is formed into a V shape. Each tip of the clipping arms is bent to form hooking parts. In the configuration of patent literature 3, the clipping arms are engaged and held at four positions, including two upper positions and two lower positions.

As shown in FIG. 9 of patent literature 3, the clip-on member in this case is such that while the clipping arms are elastically pushed inward, the hooking parts of the lower clipping arms are hooked onto the back side of the eye rim or its equivalent part of the eyeglass frame, and is made to slide upward along the nasal area of the rim. At this time, the upper portion of the clip-on member is positioned diagonally in relation to the body of the spectacle frame. In order to hook the hooking parts of the upper clipping arms on the brow side of the eyeglasses, the left and right clipping arms with the hooking parts are pressed towards the eye rim. In this way, the inwardly pushed clipping arms try to restore to their original position, generating outward pressure towards the eye rims. This outward pressure ensures that the clip-on attachment is secured in place in conjunction with the upper arms clipped to the top side of the eye rim or its equivalent part of the eyeglass frame. The sunglasses of this embodiment can be removed from the eyeglasses by performing an operation reverse to the aforementioned operation.

While the clip-on member of patent literature 3 is held by gripping the aforementioned eye rims, the lens surface should preferably not be touched by the hooking parts of the clipping arms in order to prevent damages to the lenses caused by friction with any parts of the clip-on member. Lower left and right clipping arms create pressure towards opposite sides with regard to each other and thus gripping the eye rims. Thus, attachment of the clip-ons involves action of making the lower hooking parts slide upward along the inner nasal side of the eye rims or its equivalent part of the eyeglass frame. Depending on the size and shape of the eyeglass frame, the pressure for holding the clip-ons in place cannot be kept stable and may require some adjustment in size and shape of the lower pressing arms. In some cases, this makes the attachment of the clip-ons hard or difficult.

The conventional clip-on eyeglasses employing the clip type of patent literature 1 or 2 are relatively easy to attach and detach from the eyeglass frame. However, these clip-on type eyeglasses involve direct pressing or gripping of the eyeglass lenses which might cause damage to the lens surfaces. Additionally, the gripping force may weaken, causing the clip-on to move from its proper position. The conventional clip-on type eyeglasses of patent literature 3 involve sliding motion during attachment. Additionally, depending on the biasing force, the clip-on member may not be responsive to every size of eyeglasses.

The first problem to be solved by this invention is to provide a clip-on type eyeglasses that is easy to attach and detach to and from the eyeglass frame. This invention is also intended to provide a clip-on type eyeglasses that does not touch the lenses of the eyeglass frame, while making it possible to choose a detachable lower clipping arms so as to conform to the size of the eyeglass frame.

BRIEF SUMMARY OF THE INVENTION

To solve the aforementioned problems, this invention is intended for clip-on type eyeglasses as follows.

Above clip-on type eyeglasses configured in such a manner that a clip-on member such as sunglasses is attached to the front of the spectacle frame, wherein the clip-on member includes a clip-on body to which lenses are mounted, and a pair of upper clipping arms and a pair of lower clipping arms made of elastic members for attachment to the spectacle frame, the upper clipping arm consists of an upper hooking part with which the upper clipping arm is fitted and attached to the upper part of the spectacle frame from above the eye rim, the upper clipping arm being mounted integrally to the clip-on member, the lower clipping arm consists of a pair of arms and hooking parts, the right arm and the left arm having the right and left hooking parts respectively, is connected to the pinching part and mounted to the body of the clip-on member. The lower clipping arms are intended to be placed at the nasal area of the spectacle frame, and by its elastic nature exercise outward pressure towards the eye rim of the right and left lenses of the eyeglass frame, with its right and left hooking parts engaging the eye rims, and the pinching part will change its form elastically when pressed to allow movement of the left and right hooking parts together with the respective clipping arms towards the center of the nasal area, thus permitting smooth positioning of the lower clipping arms between the right and left lenses of the spectacle frame. After positioning the right and left hooking parts so that they are holding the eye rim of the spectacle frame the pinching part is released, thereby allowing the elastic pressure to work through the holding parts towards the lenses of the eyeglass frame.

Above clip-on type eyeglasses, wherein the upper clipping arm consists of a pair of arm parts which extends from the central part of the lens mounting rod and the upper hooking parts at each end of the arm parts, and is used for hooking the clip-on member at the brow portion of the spectacle frame lenses.

Above clip-on type eyeglasses, wherein in the lower mounting tool, the central portion of the pinching part is curved downward relative to the lens mounting rod, and a bent part is formed at opposite sides of the pinch part; these bent parts are in turn inserted and held in place by the holding parts in a way that allows movement. The clipping arms are formed integrally with the bent parts, which after curving back to form a "C" shape curve extends downward relative to the lens mounting rod, and having the left and right hooking parts formed at their tips, and in the lower mounting tool, the elasticity of the material used to form the arm parts works so to move them away from each other to a certain extent when the pinching part is in a pressure free state, and if pressure is applied to the pinching part pressing it towards the lens mounting rod, the bent parts on both sides of the pinching part, which has the elastic movement restricted by the holding parts will deform elastically moving the left and right hooking parts at the tips inwards, causing the clipping arms to approach each other.

Above clip-on type eyeglasses, wherein the lower left and hooking parts are formed by bending the tips of the clipping arms of the lower mounting tool.

Above clip-on type eyeglasses, wherein in the lower mounting tool, the pinching part is curved further within the possibility of its elastic deformation to allow insertion or detachment of the bent parts on the opposing sides of the pinching part into or from the holding parts, thereby allowing attachment or detachment of the lower mounting tool itself to and from the clip-on member.

Above clip-on type eyeglasses, wherein in the holding parts, convex surfaces are formed in contact parts that hold the bent parts of the lower mounting tool, so to reduce the friction area during movement of the bent parts within the holding parts.

Above clip-on type eyeglasses, wherein the clip-on lenses are configured in such a manner that they are attached to and detached from the clip-on body freely, thereby making the clip-on lenses interchangeable depending on the purpose of use or specification of the wearer.

Above clip-on type eyeglasses, wherein each clip-on lens is provided with a connecting socket with a guiding slit, the connecting socket having an insertion hole capable of receiving the insertion piece from the lens mounting rod provided to the clip-on body, and the insertion piece from the lens mounting rod provided to the clip-on body allows the lens to be attached to and detached from the insertion hole in the lens mounting rod.

Above clip-on type eyeglasses, wherein the shaft connecting the clip-on lenses are configured in such a manner that they can rotate relative to the lens mounting rod, thereby allowing the use of the clip-on lenses in flipped up positions while the eyeglass frame is used with the clip-on member attached to it.

Above clip-on type eyeglasses, wherein the clip-on member includes: a shaft freely rotatable relative to the lens mounting rod and passing through the body of the said rod, the shaft to which the clip-on lenses are mounted on their ends; an abutting cap abutting on one end of the lens mounting rod and fixed to the shaft in a manner that disables rotation of the said cap relative to the shaft; and a base cap abutting on the opposite end of the lens mounting rod, the base cap being fixed to the shaft in a manner that disables rotation of the said cap relative to the shaft, one tip of the lens mounting rod and one tip of the abutting cap where they abut each other are each provided with a zig-zagging rim that engages in peak-to-valley state relative to each other, the abutting cap is pressed toward the lens mounting rod by the elastic force of the coil spring, creating a stable engagement of peak-to valley state between the rim of the lens mounting rod and the abutting cap, and the peak-to-valley engagement is moved to the next state in the consecutively zig-zagging rim and the next stable state is produced by flipping up the clip-on lenses by rotating the shaft, thereby holding the clip-on lenses in different stages of the flipped up positions.

This invention achieves the excellent effects as follows.

The clip-on type eyeglasses of this invention allow their attachment to the eyeglass frame by means of a simple operation of pressing the pinching part provided to the lower clipping arms, thereby facilitating their attachment and detachment to and from the eyeglass frame.

The clip-on member can be attached to the eyeglass frame by making elastic engagement with the lower part of the right and left eye rims at the nasal side of the eyeglass frame using the right and left hooking parts of the clip-on provided to the lower clipping arms made of the elastic member. Thus, the lower clipping arms will not be in direct contact with the lenses in the eyeglass frame, thereby preventing damage on the said lenses.

The lower clipping arm is made of a single elastic material configured in such a manner that their right and left end work towards opposite direction using the elastic quality of its material, thus allowing elastic engagement with the eyeglass frame. The lower clipping arms are configured in such a manner that they can be attached to and detached from the clip-on chassis and the upper clipping arms. Thus, the lower clipping arms, which are interchangeable, can be prepared in different sizes and chosen to elastically conform to the particulars of the eyeglasses that it will be used with.

Further, the lenses used for this type of clip-ons are configured in such a manner that they can be attached to and detached from the clip-on chassis freely. This makes the lenses in this type of clip-on members interchangeable depending on the purpose of use or specification required by the wearer.

Further, the mounting system of the clip-on lenses are configured in such a manner that they rotate freely relative to the clip-on chassis, thereby allowing the use of the clip-on lenses in flipped up position while the clip-on member is attached to the eyeglass frame.

BRIEF DESCRIPTION OF THE SEVERAL VIEWS OF THE DRAWINGS

FIGS. 1B and 1C are the front view and the top view respectively of the clip-on member, shown without the lenses of the said clip-on.

FIGS. 2A, 2B, 2C and 2D show components or parts of the clip-on member.

FIGS. 4A, 4B and 4C are the front views showing the attaching process of the clip-on member to an eyeglass frame.

FIGS. 5A, 5B, and 5C are the sectional views taken along the central portion of the clip-on member showing the left side of the said clip-on in the process of being attached to the eyeglass frame (contour of the eye rim is shown in dotted line)

DETAILED DESCRIPTION OF THE INVENTION

Embodiment 1

FIGS. 1A to 3 show the first embodiment, in which 1 is the clip-on chassis, 2 is the lens mounting rod and the lens mounting parts, and 3a and 3b are the lenses mounted to the lens mounting part (2a and 2b) of the clip-on chassis (1). The upper clipping arm 4 and the lower clipping arm 5 are the parts used to mount the clip-on member (FIG. 1A) onto the eyeglass frame. The upper and lower clipping arms 4 and 5 are made of elastic material so that they can respond flexibly during the mounting process of the clip-on member to the eyeglass frame and to any need of adjusting its position relative to the said frame.

Figure 1A:
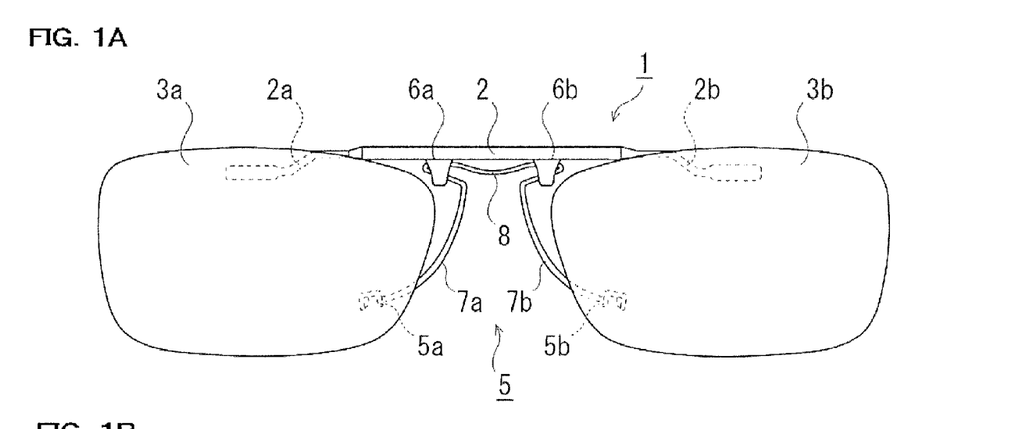
FIG. 1A is the front view of the clip-on member.
Figure 1B:
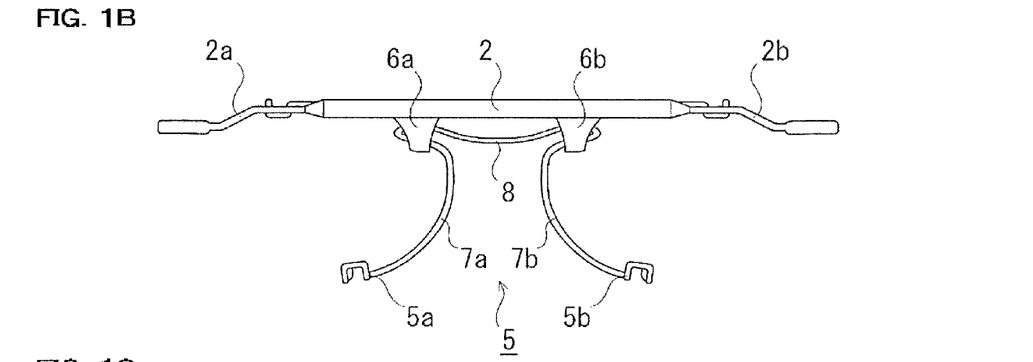

The lenses 3a and 3b are mounted and fixed to the tip of the lens mounting parts 2a and 2b, which in their turn extend to the left and right side of the lens mounting rod 2, which will be positioned at the upper portion of the eyeglass lenses so as not to obstruct the field of view. The lenses 3a and 3b may be attached to and detached from the lens mounting rod and its lens mounting parts freely and as needed. Alternatively, the lens mounting parts 2a and 2b can be configured in such a manner that they can rotate relative to the lens mounting rod 2, thereby allowing the 3a and 3b lenses to be flipped-up.

Figure 1C:
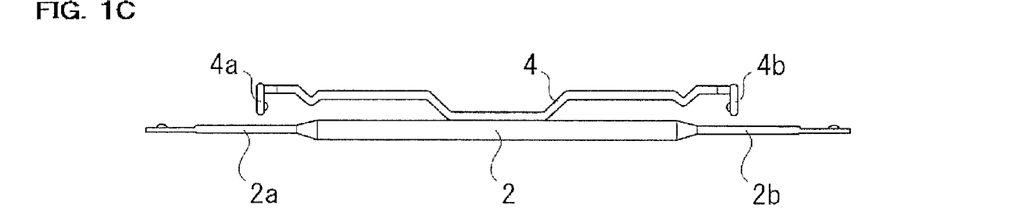

As shown in FIG. 1C, the upper clipping arms 4 include an upper hooking part 4a and another upper hooking part 4b with which the upper clipping arms 4 are fitted and mounted to the eye rim or their equivalent at the brow area of the eyeglass frame. The upper hooking parts 4a and 4b are mounted to the clip-on body 2 for example by soldering and are formed of linear members extending to the left and right of the rod containing the rotation system for the lens flip-up. As described above, the upper clipping arms 4 is made using an elastic material. This allows attachment of the clip-on member 1 to the eyeglass body flexibly without forceful maneuvers of its parts. As shown in FIG. 2C, the upper hooking parts 4a and 4b are formed by bending the linear end part of the upper clipping arms 4.

Figure 1D:
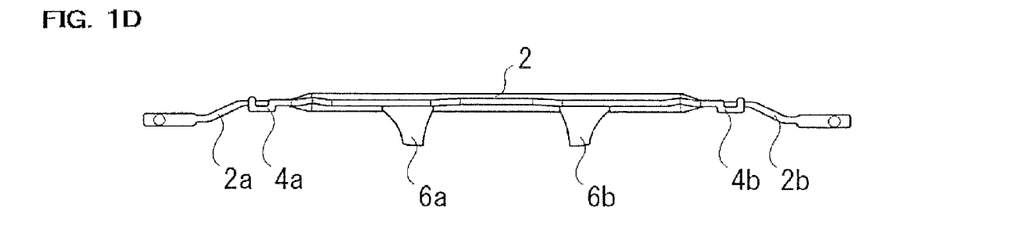
FIG. 1D is a back view of the clip-on member shown with neither the lenses nor the lower clipping arms in the first embodiment of the clip-on type eyeglasses of this invention.

The lower clipping arms 5 is fitted to and held by a holding part 6a and a holding part 6b which composes a part of the clip-on chassis 2 by means of soldering or an equivalent method. As described above, the lower clipping arm 5 is made with an elastic material. The lower clipping arms 5 includes the arm part 7a and the arm part 7b, having at its end the lower left hooking part 5a and the lower right hooking part 5b, and the pinching part 8 that can change the space between the arm parts 7a and 7b. The arm parts 7a and 7b and the pinching part 8 are formed as a single piece including the left bent part 9a and the right bent part 9b. The left and right bent parts 9a and 9b have enhanced elastic property and are fitted and held in the holding parts 6a and 6b.

Figure 2A:
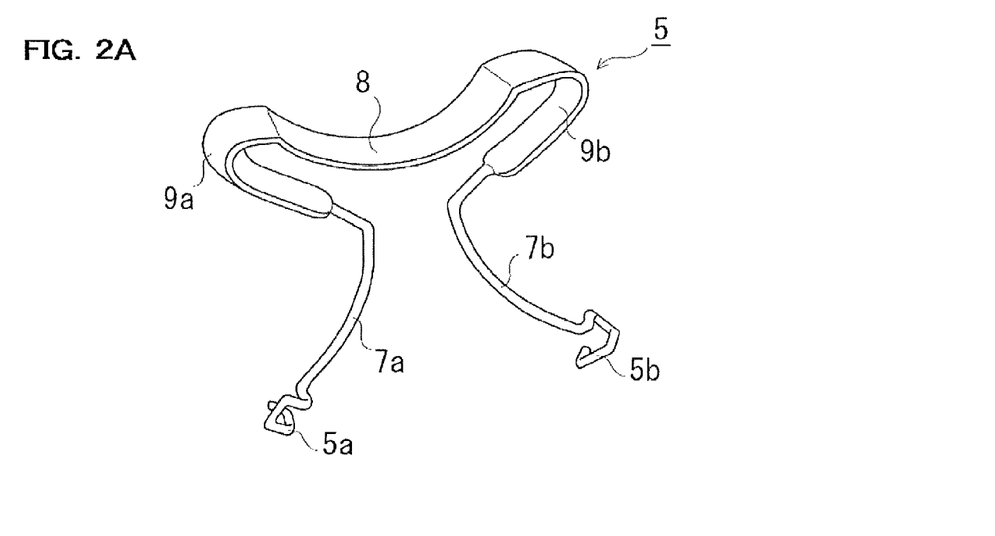
FIG. 2A is a perspective view showing the overall shape of the lower clipping arms.

As shown in FIG. 2A, in the lower clipping arms 5, the pinching part 8 and the left and right bent parts 9a and 9b are made of elastic material with enhanced springy property while the arm parts 7a and 7b are made of linear elastic material. These parts are formed from a single piece material. As shown in FIG. 2D, both the lower left and lower right hooking parts 5a and 5b are formed by bending the ends of the arm parts 7a and 7b. As shown in the drawings, in the lower clipping arm 5, the arm parts 7a and 7b are formed in a way that the springiness of the material works to make their tips move away from each other to a certain extent. The pinching part 8 is formed so as to curve downward in relation to the clip-on chassis 2. The shapes in these parts are maintained as drawn in FIG. 2A while in a stress-free state, and its shape can be changed elastically from this position by applying a pressure at pinching part 8.

Figure 2B:
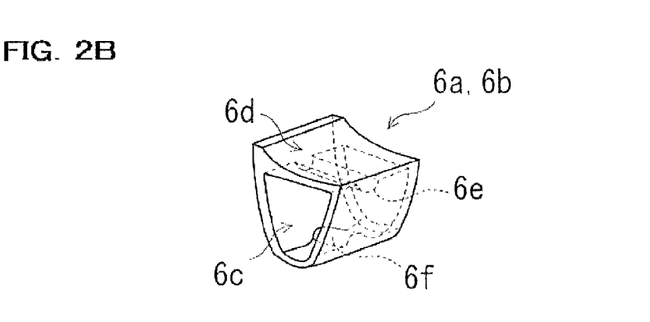
FIG. 2B is a perspective view showing the holding part for the lower clipping arms.
Figure 2C:
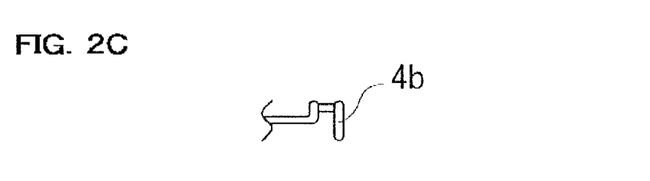
FIG. 2C is an explanatory view showing how the hooking part of the upper clipping arm is bent.
Figure 2D:
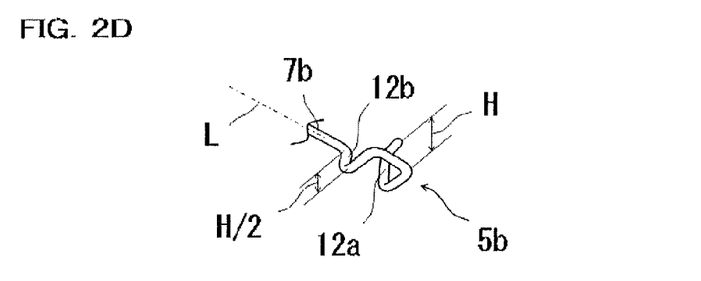
FIG. 2D is an explanatory view showing how the hooking part of the lower clipping arm is bent.

As shown in FIG. 2B, the holding parts 6a and 6b form a cavity 6c and an upper surface bonding part 6d mounted to the clip-on chassis 2 by soldering or an equivalent method. The cavity 6c is configured to allow insertion of the bent parts 9a and 9b of the aforementioned lower clipping arms 5 in the cavity 6c. The surface of the cavity's inner wall 6c is provided with upper and lower "bumps" configured in a convex curve 6e and 6f, to serve as the contact points with the inserted bent parts 9a and 9b. Specifically, the presence of these convex "bumps" 6e and 6f reduces contact areas of the bent parts 9a and 9b inserted in the cavity 6c, thus reducing the friction between the bent parts 9a and 9b and the wall of the holding parts 6a and 6b while it slides to move the lower clipping arms 7a and 7b.

Figure 3:
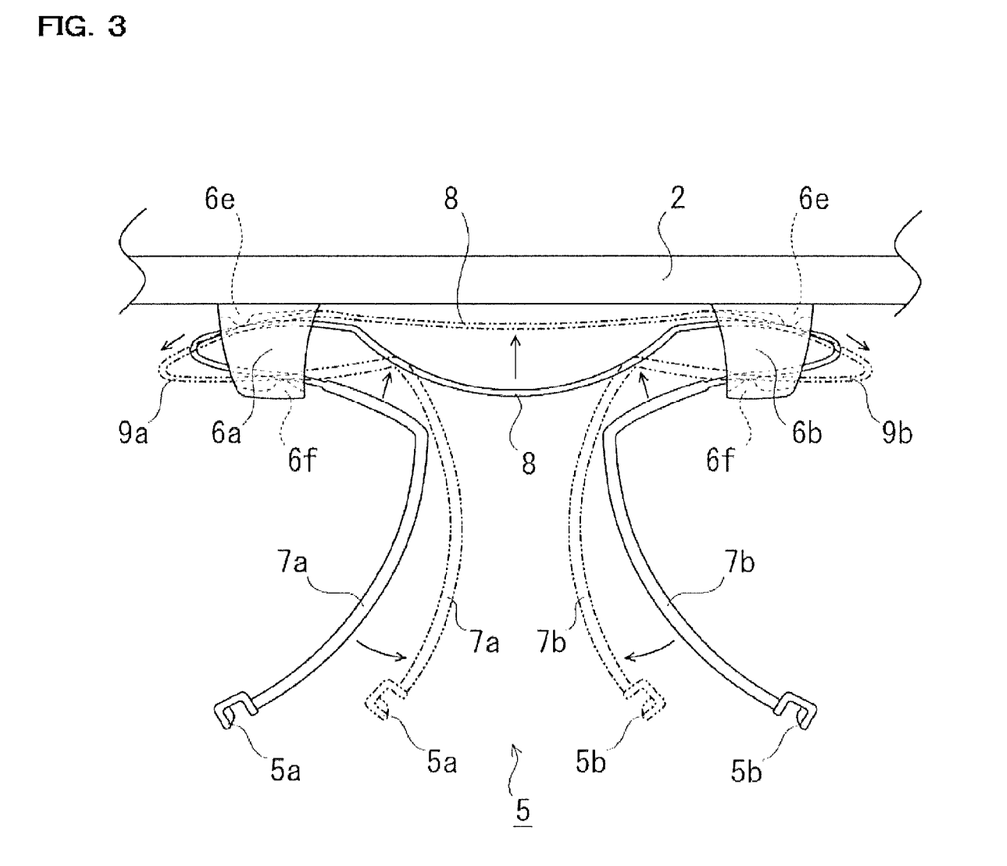
FIG. 3 is an explanatory view showing the movement of the lower clipping arm.

The operation of the lower clipping arms 5 is described next in FIG. 3. In a state where no external pressure is applied to the lower clipping arms 5, the said part is held to the clip-on member by the holding parts 6a and 6b as indicated by the solid line. In this state, the arm parts 7a and 7b are widely separated from each other and the lower left and right hooking parts 5a and 5b are positioned further apart than the distance between the right and left eye rims of the spectacle frame (not shown in FIG. 3). In this state, the central portion of the pinch part 8 curves downward from the clip-on body 2. Further, the holding parts 61 and 6b restrains the expanding pressure of the bent parts 9a and 9b of the clipping arms.

The curved portion of the pinch part 8 is pinched with the clip-on body 2 in order to move the pinch part 8 in the direction indicated by the arrow, thereby flattening the curve of the pinch part 8. This action with the pinch part 8 further moves both bent parts 9a and 9b within the holding parts 6a and 6b, which in its turn will create additional pressure causing movements of the lower clipping arms 7a and 7b. As a result of this compression, the lower clipping arm parts 7a and 7b, which are formed as a single piece as extension of the bent parts 9a and 9b and which is widely apart while no pressure is applied, will move closer towards each other. This moving state is shown by the dashed line in FIG. 3. In this pressured state, the lower left and right hooking parts 5a and 5b of the clipping arms 7a and 7b move to a position narrower than the distance between the eye rims of the left and right eye of the spectacle frame.

Figure 4A:
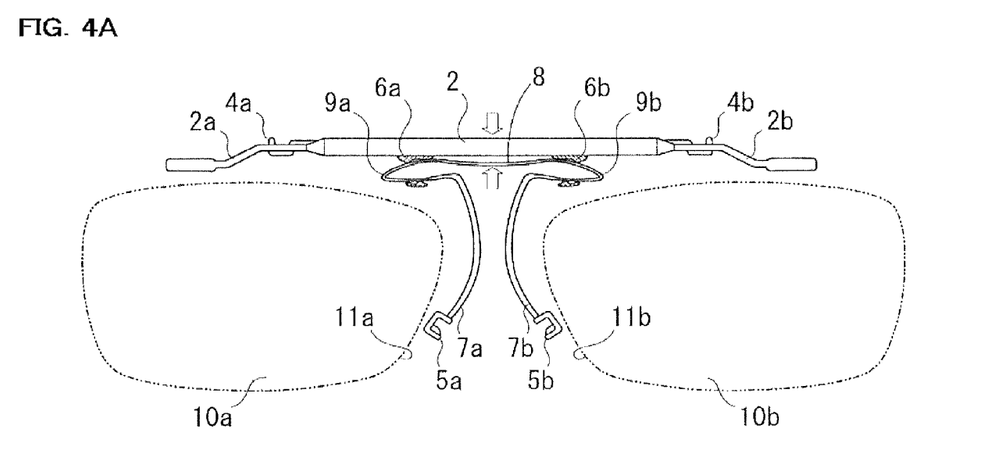
FIG. 4A is an explanatory view showing the state in which the pinching part of the lower clipping arms is pressed to move the said arms closer to each other and away from the position of the rims of the eyeglass frame (contour of the rims are shown in dotted lines)
Figure 4B:
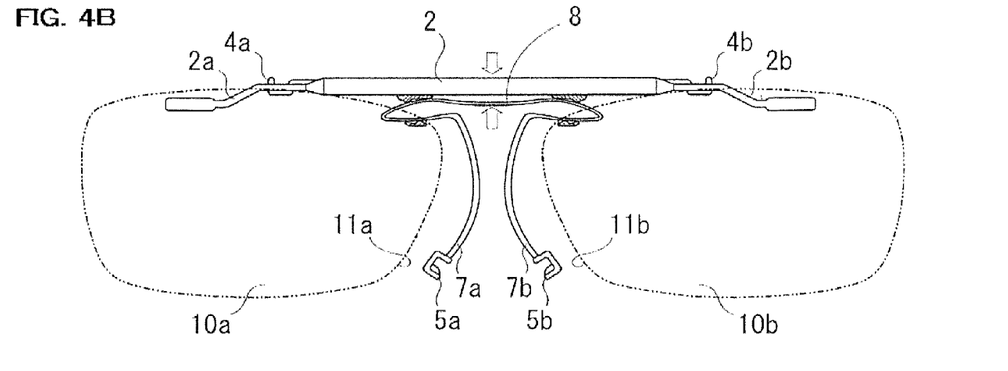
FIG. 4B is an explanatory view showing the state in which the clip-on member is positioned to fit the eyeglass frame.
Figure 4C:
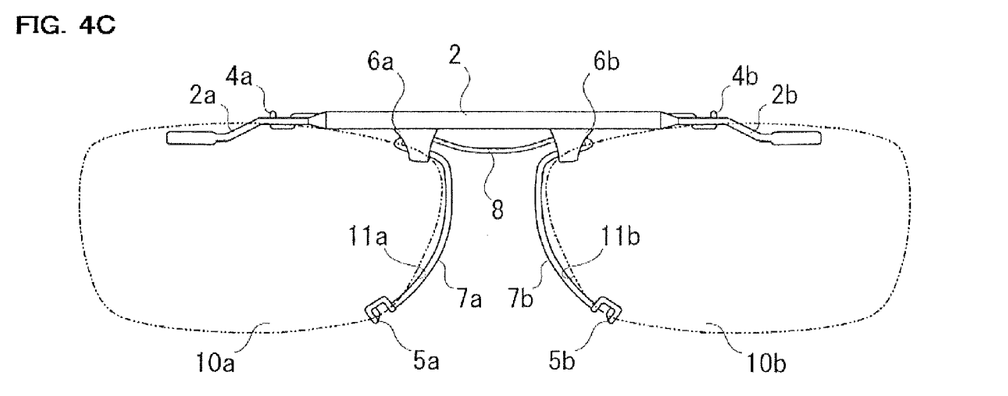
FIG. 4C is an explanatory view showing the state in which the clip-on member is fitted onto to eyeglass frame.
Figure 5A:
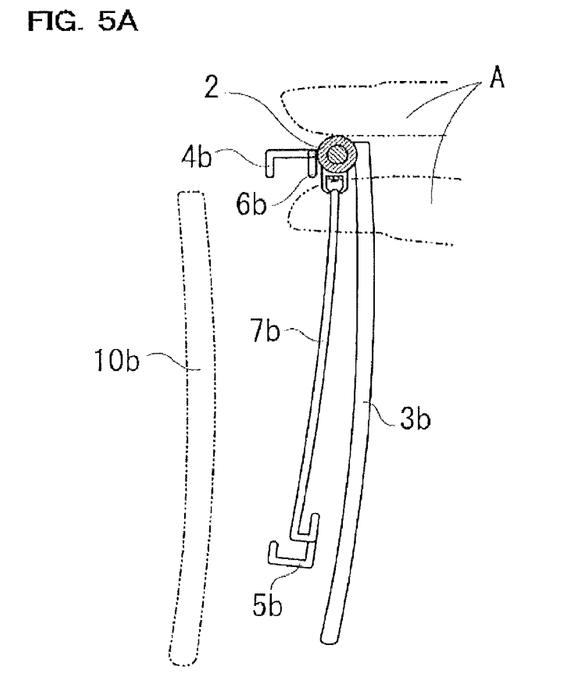
FIG. 5A is an explanatory view showing the state in which the pinching part is pressed to make the lower clipping arms move towards each other, thus allowing them to align with the rims of the eyeglass frame at the nasal area.
Figure 5B:
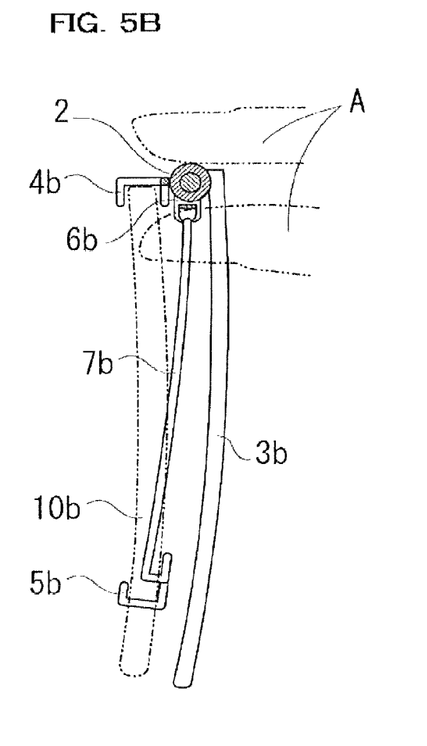
FIG. 5B is an explanatory view showing the state in which the hooking part of the upper clipping arm is fitted in the state of FIG. 5A.
Figure 5C:
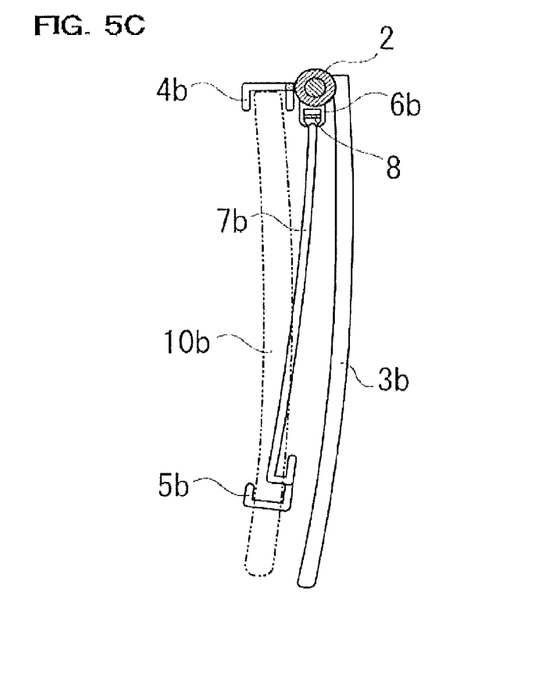
FIG. 5C is an explanatory view showing the state in which the hooking part of the lower clipping arm is also engaged is the sectional view taken along the central portion of the clip-on member showing the left side of the said clip-on in the process of being attached to the eyeglass frame (contour of the eye rim is shown in dotted line).

The attachment procedure of the clip-on body 1 of the aforementioned configuration to the spectacle frame is described next based on FIGS. 4A-5C. In FIGS. 4A-4C, the lenses 3a and 3b of the clip-on member 1 are omitted and the lens form shown in dashed line is that of the spectacle frame. FIGS. 5A-5C are sectional views taken along the central portion of the clip-on body 1 showing the left eye side from the nasal area. FIGS. 5A-5C, 10a and 10b are the lenses of the spectacle frame. The lenses 10a and 10b may be rimless lenses, Naylor lenses or lenses with full rim mounted in spectacle frames of any construction type and material.

FIGS. 4A and 5A show a state where the pinch part 8 of the lower clipping part 5 is pressed with fingers A, causing the clipping arms 7a and 7b to move in the direction that makes the arm parts 7a and 7b approach each other. Further, the lower left and right hooking parts 5a and 5b are placed in line with the eye rim at the lower part of the nasal areas 11a and 11b of the spectacle lenses 10a and 10b. This state can place the upper hooking parts 4a and 4b and the lower hooking parts 5a and 5b in a position where these parts can be hooked to the eyeglass lenses 10a and 10b of the spectacle frame.

FIGS. 4B and 5B show a state where the upper hooking parts 4a and 4b are engaged with and fitted to the brow area of the eyes of the spectacle frame while the pinch part 8 remains pinched with the fingers A. In this state, while the upper hooking parts 4a and 4b are fitted to the brow area of the eyes of the spectacle frame, and the lower hooking parts 5a and 5b face the nasal side of the eyes of the spectacle frame 10a and 10b in such a way that the hooking parts 5a and 5b will clip the side of the eyes of the frame, the position of the clipping arms 7a and 7b are still elastically displaced at a distance closer to each other than when they are found in a pressure free state. Specifically, the lower hooking parts 5a and 5b are still not engaged with the lower nasal portions 11a and 11b of the lens parts 10a and 10b of the spectacle frame.

Releasing the pressure on the pinch part 8 allows engagement of the lower hooking parts 5a and 5b with the lower nasal area of the eye rims 11a and 11b in the lenses 10a and 10b of the spectacle frame, as shown in FIGS. 4C and 5C. In this state, the lower hooking parts 5a and 5b will work towards opposite direction to each other, moving the lower clipping arms 5 towards the rims 11a and 11b of the spectacle frame. As a result, the lower hooking parts 5a and 5b are engaged with and held on the eye rims in the lower nasal area 11a and 11b of the lens parts 10a and 10b of the spectacle frame. In this state, attachment of the clip-on member 1 to the left and right lens parts 10a and 10b of the spectacle frame is completed.

Described next in FIGS. 4C and 5C are how the clip-on member 1 attached to the left and right lens parts 10a and 10b of the spectacle frame is detached. For detachment, the pinch part 8 of the lower clipping arm 5 is pinched with fingers A to elastically move the arm parts 7a and 7b towards each other. This releases the lower left and right hooking parts 5a and 5b from the state of engagement with the eye rims 11a and 11b of the left and right eyeglass lens parts 10a and 10b. Next, the clip-on member is lifted up slightly while remaining pinched with fingers A at the pinch part 8 to release the upper hooking parts 4a and 4b from the engagement with the brow area of the eye rims or its equivalent material. In this state, the pinch part 8 is pulled away from the eyeglass lens parts 10a and 10b of the spectacle frame, thereby producing the state shown in FIGS. 4A and 5A.

The attachment and the detachment described above as illustrated in FIGS. 4A-5C can be executed as a series of continuous actions. Specifically, the clip-on member 1 can be attached and detached easily to the front of the spectacle frame by pinching and pressing the pinch part 8 of the clip-on member 1 for its attachment and similarly detaching it by pinching and pressing the pinch part 8 of the clip-on member 1 and pulling it away from the spectacle frame.

The shape of the lower hooking parts 5a and 5b relative to the arm parts 7a and 7b of the lower clipping arms 5 is described next. As shown in FIG. 2D referred to previously, the lower hooking parts 5a and 5b are formed by bending. This bending is such that an extended portion of the center line L of each of the arm parts 7a and 7b is placed along the central portion of the dimension H, which corresponds to the sustaining part 12a that will grip the eye rim or its equivalent part of the spectacle frame. Thus, the bent part 12b, measuring half the dimension H, is formed by bending the arm part 7b parallel to the sustaining part 12a. This relationship is understood more clearly in FIGS. 5A-5C showing the side views of the lower clipping part 5b to be engaged with the left lens 10b of the spectacle frame. This configuration makes the elastic pressure that the sustaining part 12a exercises on the eye rims 11b at the lower nasal area of the spectacle frame, in conjunction with the lower clipping arm 7b, function to attain a stable fit of the clip-on member 1 to the spectacle frame.

The lower clipping arm 5 can be attached and detached freely from the holding parts 6a and 6b. The clipping arm 5 can be attached as shown in FIG. 3. Either of the bent parts 9a or 9b is inserted in its corresponding holding parts 6a or 6b. While the inserted bent part 9a or 9b is compressed in the cavity 6c of either of the holding parts 6a or 6b, pressure is applied to the pinch part 8 curving it further until the bent part on the other side can be inserted in the other remaining holding part 6c.

The mechanism of attachment and detachment of the lower clipping arms 5 to and from the holding parts 6a and 6b, allows the lower clipping arms 5 of different sizes to be selected and used to conform to the size of the spectacle frame.

The upper clipping arms 4a and 4b, and the lower clipping arms 7a and 7b may be provided with covers made of a material such as resin, rubber, silicone or other flexible material in order to protect the spectacle frame from scratches or other potential damages that can be caused by friction with the clip-on member 1.

Embodiment 2

The second embodiment is described next. In this embodiment, like in the aforementioned embodiment, the clip-on member is configured in such a manner that it can be attached to and detached from the spectacle frame freely. Further, the mounting of the clip-on lenses are configured in such a manner that they can be attached to and detached from the clip-on member freely, thereby making those lenses interchangeable depending on the purpose of use or the user's specification.

Figure 6A:
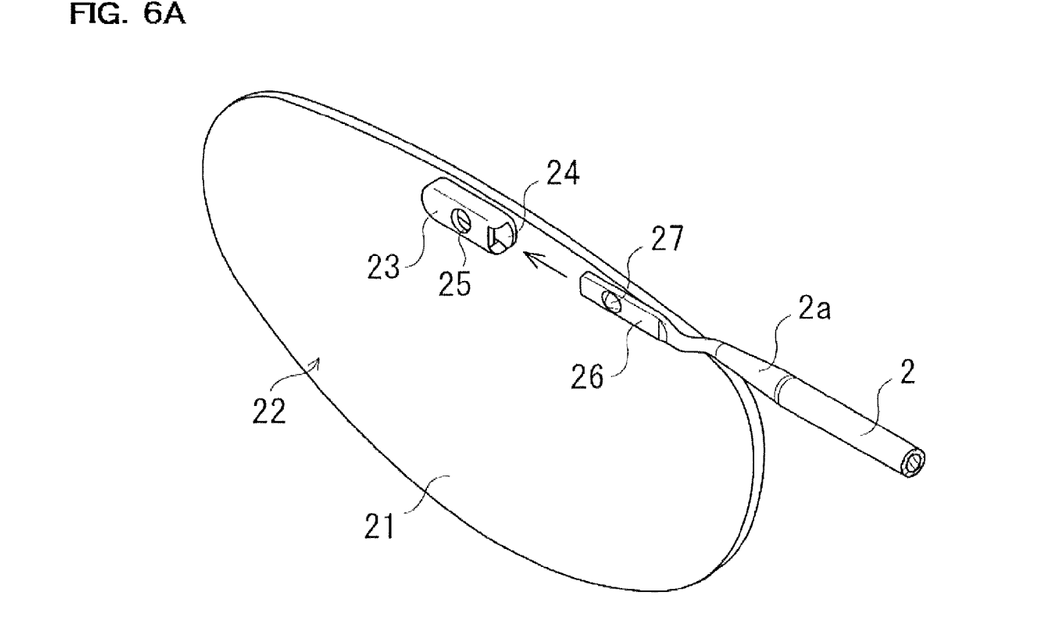
FIG. 6A is an explanatory view showing a part of the clip-on chassis and the lens while the lens is being mounted to the clip-on member.
Figure 6B:
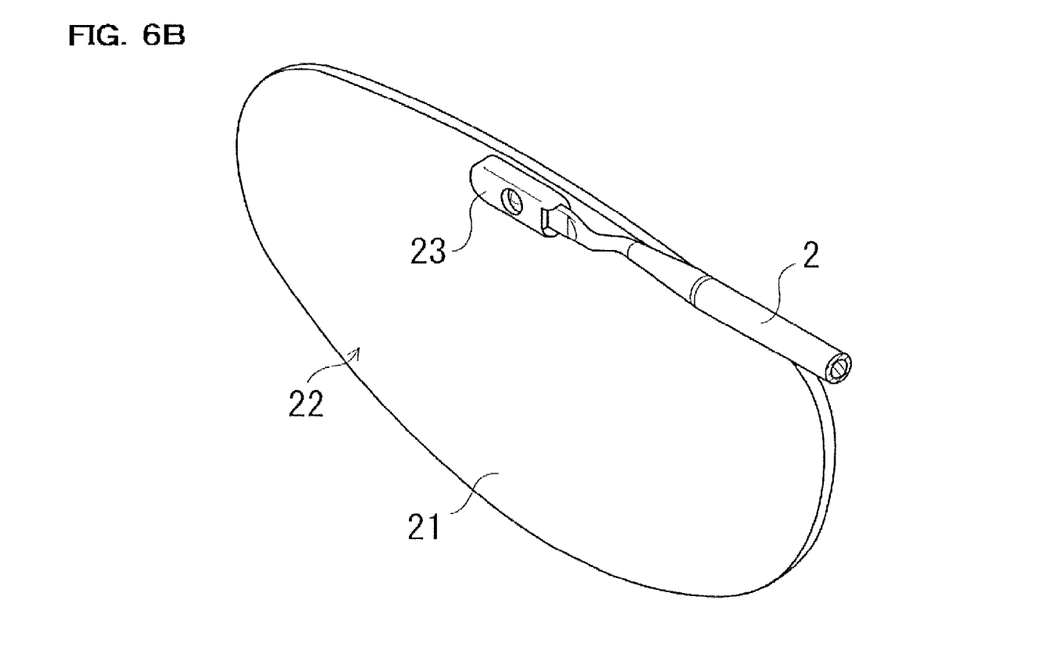
FIG. 6B is an explanatory view showing the clip-on member in the state after the lens mounting is completed in the second embodiment of the clip-on type eyeglasses of this invention.

More specifically, as shown in FIGS. 6A and 6B, a connecting socket 23 is provided on the back side 22 of the clip-on lens 21. The connecting socket 23 is provided with an insertion hole 24 and a holding hole 25. The clip-on body 2 is provided with the insertion part 26 formed on both ends of the lens connecting parts 2a and 2b. The insertion piece 26 is provided with a dome shaped protrusion 27 at the central area of the surface of the insertion piece 26 for its engagement with the holding hole 25. In this configuration, the insertion piece 26, as part of the lens mounting rod 2, is placed to face the insertion hole 24 of the connecting socket 23 in the clip-on lens 21, as shown in FIG. 6A. Then, the insertion socket 26 is inserted into the direction indicated by arrow until the dome shaped protrusion 27 engages in the holding hole 25, as shown in FIG. 6B. Thus, the clip-on lens 21 can be mounted to the chassis 1.

Embodiment 3

The third embodiment is described below. In this embodiment, like in the aforementioned embodiments, a clip-on member is configured in such a manner that it can be attached to and detached from a spectacle frame freely. Further, the clip-on lenses, when mounted in the lens mounting rod, are configured in a manner to rotate with the lens mounting rod and relative to the clipping arms, thereby allowing the use of the clip-on lenses in a flipped up position while the clip-on member is attached to the spectacle frame.

Figure 7A:
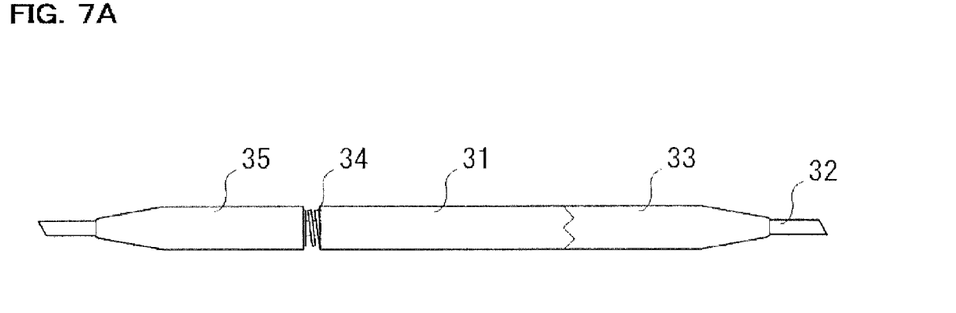
FIGS. 7A and 7B are the front views and the sectional view respectively, showing the part of the flip-up rotation system of the clip-on member in the third embodiment of the clip-on type eyeglasses of this invention.
Figure 7B:
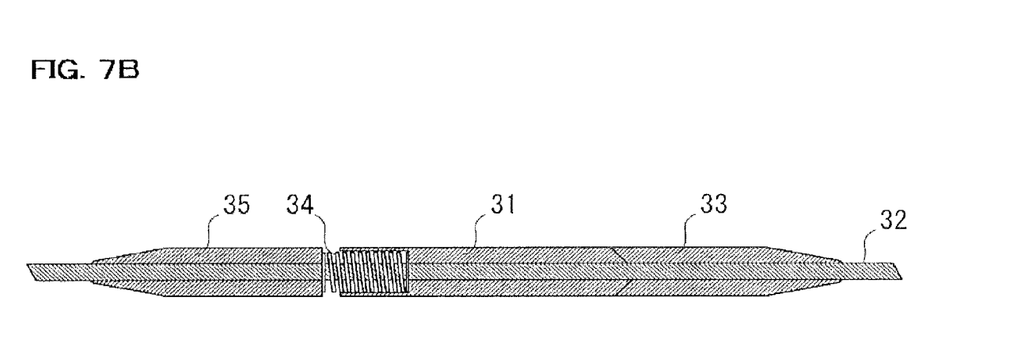

More specifically, as shown in FIGS. 7A and 7B, the clip-on member as formed by the main body 31, the shaft 32 that rotates relative to and passes through the inside of the main body 31, the abutting cap 33 fixedly attached to the shaft 32, a coil spring 34, and the base cap 35. The clip-on lenses are mounted on the opposite ends of the shaft 32. As shown in these drawings, the main body 31, the abutting cap 33, and the base cap 35 are configured as tubular parts that allow the shaft 32 to pass through them. The rim of the main body 31 where it abuts the abutting cap 33 is formed as a sequence of zig-zagging shape. Likewise, the abutting cap 33 is provided with a rim with the zig-zagging shape corresponding to the rim of the main body 31, so that the peak of the zig-zag on one side will fill the valley on the other side and so on, alternately and continuously.

The coil spring 34 is wound around the shaft 32. The main body 31 abuts with the base cap 35 at the coil spring 34. As shown in drawings 7a and 7b, the main body 31 is carved inside at one end to accommodate a part of the coil spring 34. On the contrary, except for the hole letting the shaft 32 pass through, the surface of the rim of the base cap 35 where it abuts the coil spring 34 is smooth without any cut or carving. Thus, the coil spring 34 abuts on the flat surface of the base cap 35. The main body 31 and the shaft 32 can be rotated relative to each other. The abutting cap 33 and the base cap 35 are fixed to the shaft 32 so as not to allow rotation of the abutting cap 33 and the base cap 35 relative to the shaft 32. This makes the abutting cap 33 and the base cap 35 move integrally with the shaft 32.

Figure 8A:
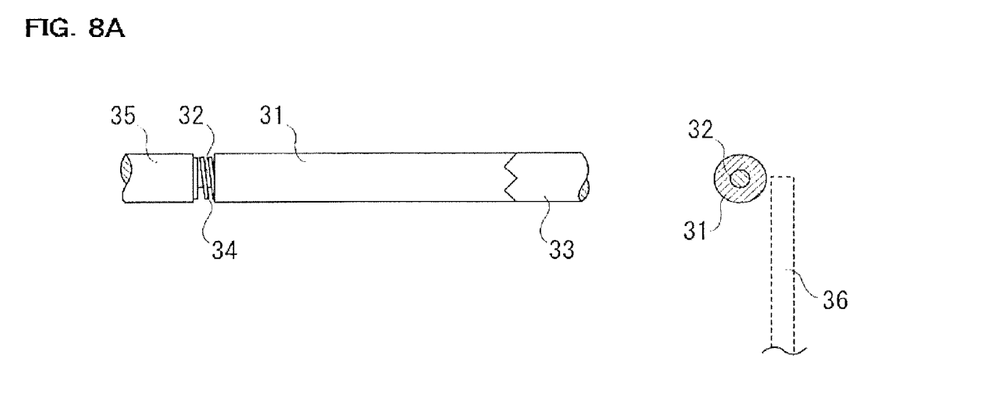
FIGS. 8A, 8B, and 8C are explanatory views showing the flip-up action of the lenses in the third embodiment.
Figure 8B:
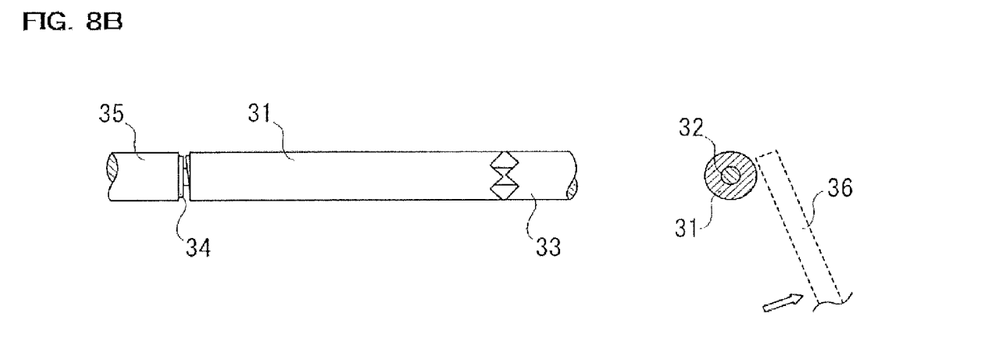
Figure 8C:
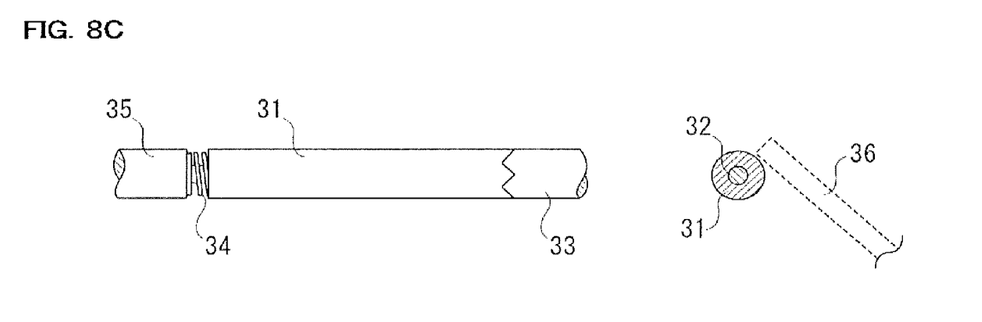

The aforementioned configuration at the abutting cap 33 and the main body 31 provides the clip-on lenses with flip-up system with multistage stop function. Firstly, as shown in FIG. 8A, where the zig-zagging parts at the abutting end of the main body 31 and the abutting cap 33 are engaged with each other in peak-to-valley state, the lenses 36 mounted to the shaft 32 are in closed and stable state. The lenses 36 can be flipped-up by rotation of the abutting cap 33 and the base cap 35 through means of the shaft 32. This disengages the peaks and the valleys at the abutting end of the main body 31 and the abutting cap 33 as shown in FIG. 8B. When the abutting parts on both sides of main body 31 and abutting cap 33 meets peak-to-peak, the coil spring 34 acts to place the lenses 36 in the next stable rotated position by subsequent engagement of the main body 31 and the abutting cap 33 in the peak-to-valley position as shown in FIG. 8C. Specifically, the clip-on lenses 36 are thus placed in the initial flipped-up stable position. Then, the lenses 36 can be rotated further up to the next peak-to valley position formed by the main body 31 and the abutting cap 33 be, which will place the clip-on lenses 36 at the further flipped-up and stable position.

What is claimed:

1. Clip-on type eyeglasses configured in such a manner that a clip-on member such as sunglasses is attached to the front of the spectacle frame, wherein the clip-on member includes a clip-on body to which lenses are mounted, and a pair of upper clipping arms and a pair of lower clipping arms made of elastic members for attachment to the spectacle frame, the upper clipping arm consists of an upper hooking part with which the upper clipping arm is fitted and attached to the upper part of the spectacle frame from above the eye rim, the upper clipping arm being mounted integrally to the clip-on member, the lower clipping arm consists of a pair of arms and hooking parts, the right arm and the left arm having the right and left hooking parts respectively, is connected to the pinching part and mounted to the body of the clip-on member, the lower clipping arms are placed at the nasal area of the spectacle frame, and by its elastic nature exercise outward pressure towards the eye rim of the right and left lenses of the eyeglass frame, with its right and left hooking parts engaging the eye rims, and the pinching part will change its form elastically when pressed to allow movement of the left and right hooking parts together with the respective clipping arms towards the center of the nasal area, thus permitting smooth positioning of the lower clipping arms between the right and left lenses of the spectacle frame, after positioning the right and left hooking parts so that they are holding the eye rim of the spectacle frame the pinching part is released, thereby allowing the elastic pressure to work through the holding parts towards the lenses of the eyeglass frame.

2. The clip-on type eyeglasses according to claim 1, wherein the upper clipping arm consists of a pair of arm parts which extends from the central part of the lens mounting rod and the upper hooking parts at each end of the arm parts, and is used for hooking the clip-on member at the brow portion of the spectacle frame lenses.

3. The clip-on type eyeglasses according to claim 1, wherein in the lower mounting tool, the central portion of the pinching part is curved downward relative to the lens mounting rod, and a bent part is formed at opposite sides of the pinch part; these bent parts are in turn inserted and held in place by the holding parts in a way that allows movement, the clipping arms are formed integrally with the bent parts, which after curving back to form a "C" shape curve extends downward relative to the lens mounting rod, and having the left and right hooking parts formed at their tips, and in the lower mounting tool, the elasticity of the material used to form the arm parts works so to move them away from each other to a certain extent when the pinching part is in a pressure free state, and if pressure is applied to the pinching part pressing it towards the lens mounting rod, the bent parts on both sides of the pinching part, which has the elastic movement restricted by the holding parts will deform elastically moving the left and right hooking parts at the tips inwards, causing the clipping arms to approach each other.

4. The clip-on type eyeglasses according to claim 3, wherein the lower left and hooking parts are formed by bending the tips of the clipping arms of the lower mounting tool.

5. The clip-on type eyeglasses according to claim 3, wherein in the lower mounting tool, the pinching part is curved further within the possibility of its elastic deformation to allow insertion or detachment of the bent parts on the opposing sides of the pinching part into or from the holding parts, thereby allowing attachment or detachment of the lower mounting tool itself to and from the clip-on member.

6. The clip-on type eyeglasses according to claim 3, wherein in the holding parts, convex surfaces are formed in contact parts that hold the bent parts of the lower mounting tool, so to reduce the friction area during movement of the bent parts within the holding parts.

7. The clip-on type eyeglasses according to claim 1, wherein the clip-on lenses are configured in such a manner that they are attached to and detached from the clip-on body freely, thereby making the clip-on lenses interchangeable depending on the purpose of use or specification of the wearer.

8. The clip-on type eyeglasses according to claim 7, wherein each clip-on lens is provided with a connecting socket with a guiding slit, the connecting socket having an insertion hole capable of receiving the insertion piece from the lens mounting rod provided to the clip-on body, and the insertion piece from the lens mounting rod provided to the clip-on body allows the lens to be attached to and detached from the insertion hole in the lens mounting rod.

9. The clip-on type eyeglasses according to claim 1, wherein the shaft connecting the clip-on lenses are configured in such a manner that they can rotate relative to the lens mounting rod, thereby allowing the use of the clip-on lenses in flipped up positions while the eyeglass frame is used with the clip-on member attached to it.

10. The clip-on type eyeglasses according to claim 9, wherein the clip-on member includes: a shaft freely rotatable relative to the lens mounting rod and passing through the body of the said rod, the shaft to which the clip-on lenses are mounted on their ends; an abutting cap abutting on one end of the lens mounting rod and fixed to the shaft in a manner that disables rotation of the said cap relative to the shaft; and a base cap abutting on the opposite end of the lens mounting rod, the base cap being fixed to the shaft in a manner that disables rotation of the said cap relative to the shaft, one tip of the lens mounting rod and one tip of the abutting cap where they abut each other are each provided with a zig-zagging rim that engages in peak-to-valley state relative to each other, the abutting cap is pressed toward the lens mounting rod by the elastic force of the coil spring, creating a stable engagement of peak-to valley state between the rim of the lens mounting rod and the abutting cap, and the peak-to-valley engagement is moved to the next state in the consecutively zig-zagging rim and the next stable state is produced by flipping up the clip-on lenses by rotating the shaft, thereby holding the clip-on lenses in different stages of the flipped up positions.

* * * * *